UNITED STATES PATENT OFFICE.

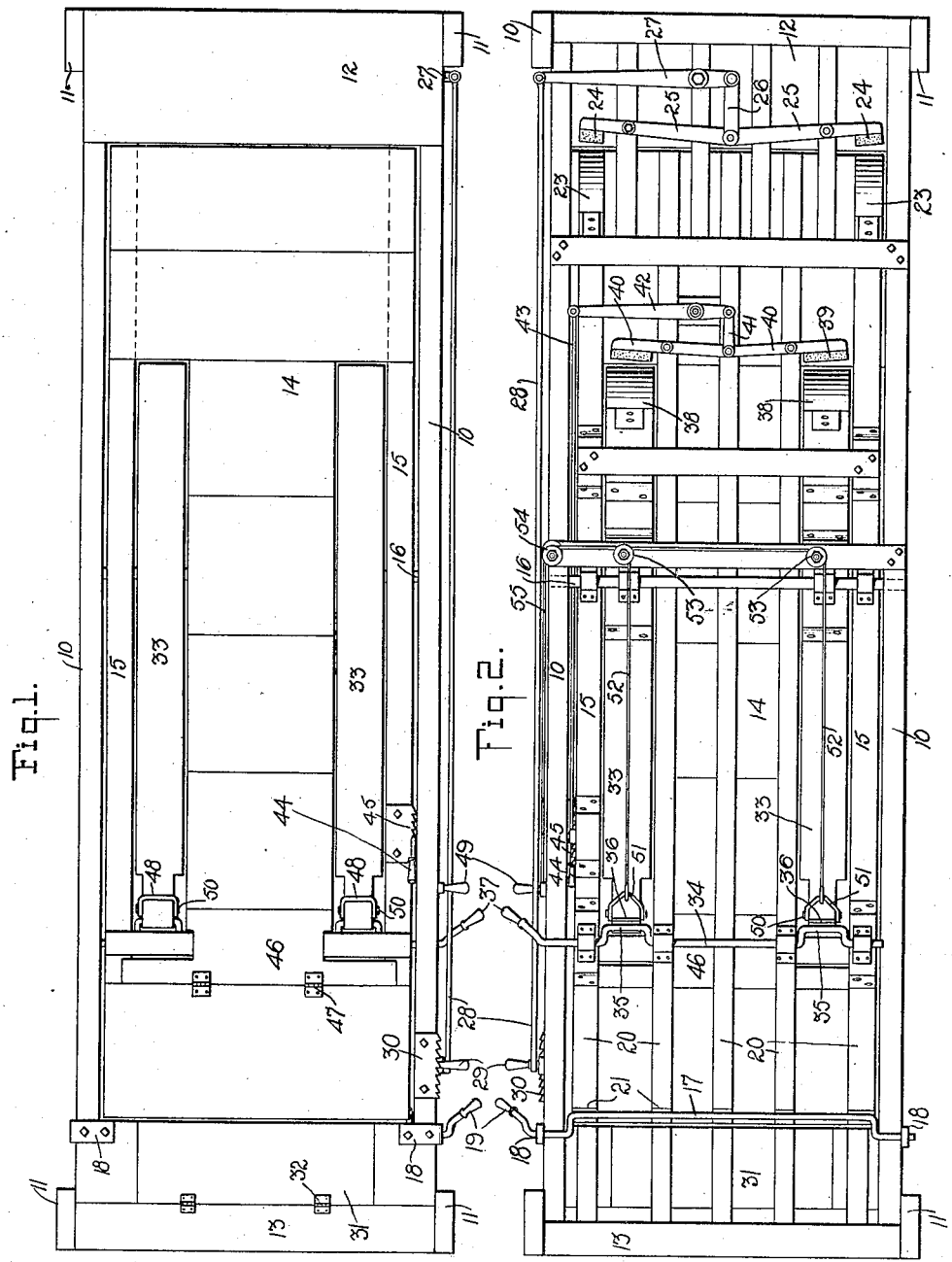

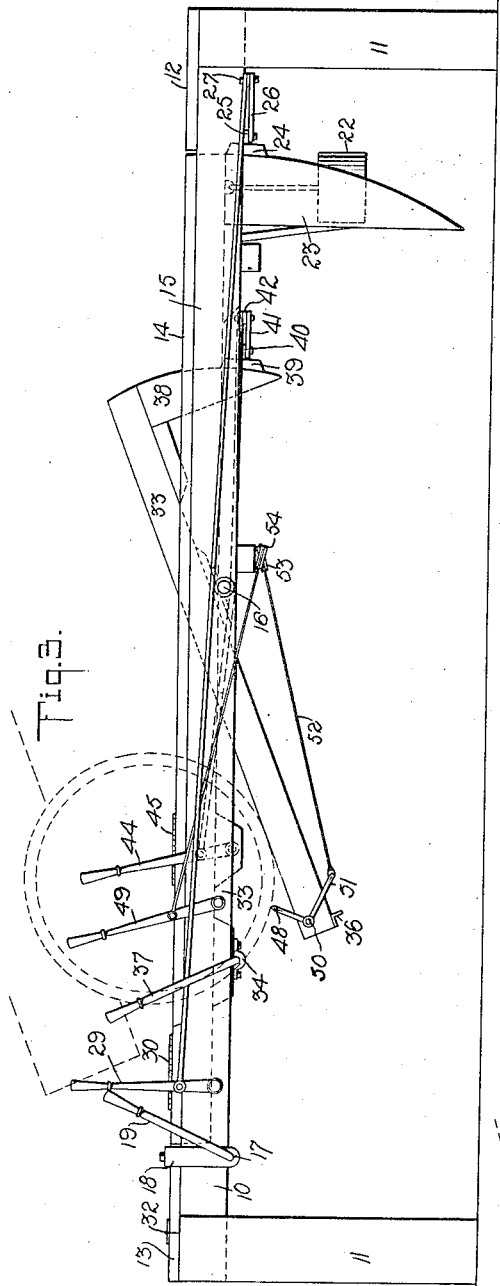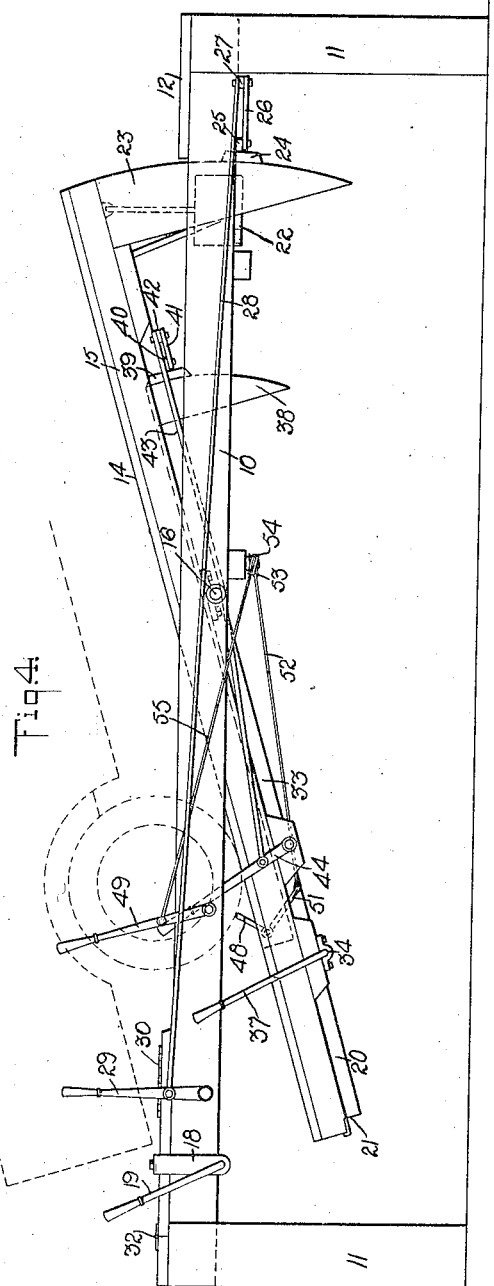

FRANK J. LEECH AND WILLIAM H. MYERS, OF OTTAWA, ILLINOIS.

COMBINED WAGON AND AUTOMOBILE DUMP.

1,335,585.

Specification of Letters Patent. Patented Mar. 30, 1920.

Application filed July 11, 1919. Serial No. 310,273.

*To all whom it may concern:*

Be it known that we, FRANK J. LEECH and WILLIAM H. MYERS, citizens of the United States, and residents of Ottawa, in the county of La Salle and State of Illinois, have invented a new and Improved Combined Wagon and Automobile Dump, of which the following is a full, clear, and exact description.

Our invention relates to vehicle dumps of the type in which the wheel supports for the vehicle are adapted to assume a position for tilting the vehicle bodily. More especially the invention relates to a dump in which provision is made for receiving and dumping either a wagon, or an automobile or truck.

The general object of the invention is to provide a dump of the indicated character improved in various particulars, whereby certain advantages and new results are obtained, among which are the following: A wagon dump in the form of stringers rockably mounted to assume a tilted position relative to the automobile dump, or in the plane of the automobile dump, has latching means to hold the wagon dump in position to tilt with the automobile dump without relative movement and the same wheel blocks are employed for both wagons and automobiles and have controlling means for positioning them for active service or to permit them to lie in a position to present no obstruction to the roadway afforded by the platform; novel controlling means is provided for giving a braking action on the wagon dump or the automobile dump and said controlling means is arranged at the front end of the dump to thereby provide the maximum clearance at the rear end for the tilting of the automobile dump and permitting of the rear end of the grain box dropping to a position below the flooring, thereby enabling the dump to assume an angle for the free discharge of the grain; also, the arrangement permits of the pit extending beneath the rear end of the dump so that the end gate of the vehicle may be removed before the vehicle is dumped and without liability of the contents being thrown beyond the opening leading to the pit.

Other advantages and distinctive features will appear from the specific description following.

Reference is to be had to the accompanying drawings forming a part of this specification, it being understood that the drawings are merely illustrative of one example of the invention.

Figure 1 is a plan view of a combined wagon and automobile dump embodying our invention;

Fig. 2 is an inverted plan view thereof;

Fig. 3 is a side elevation with only the wagon dump in tilted position for the dumping of a wagon;

Fig. 4 is a similar view with the combined dump in tilted position for the dumping of an automobile or truck.

In carrying out our invention in accordance with the illustrated example a suitable fixed frame is provided advantageously presenting longitudinal stringers 10 at the sides, the frame being here shown as supported on legs 11. On the frame fixed platform sections 12 and 13 are provided at the front and rear ends respectively on which vehicles may roll to and from the dumping elements.

A dumping platform 14 is provided presenting side stringers 15 within fixed stringers 10 and mounted to tilt with the transverse shaft or rod 16 as a center. Latch means is provided at the rear end of the platform 14 to hold the same in the raised position at a level with the roadway. Said latch means is in the form of a transverse rock shaft 17 turning in hanger bearings 18 or their equivalent on the stringers 10, said shaft being offset or of cranked form at the center and for its major portion so as to swing beneath or away from the adjacent rear end of the platform. One end of the shaft is provided with a lever handle 19 for turning it to and from the latching position. In the latching position the shaft engages in gains or rabbets 21 formed in the ends of the stringers 15 and intermediate beams 20. When an automobile truck or the like is driven on the platform and the latch 17 is released, the rear end of the platform will drop to tilt the automobile to permit the contents to readily flow therefrom. When the load has been dumped counterweights 22 on the platform at the front cause the platform to return to the raised position. The movement of the platform to the dumping position is controlled as follows: Depending members 23 are provided rigid with the platform at its front end adjacent to the fixed platform section 12 and present a convex front surface, the curve of which is struck approximately from the center of the shaft 16. Brake shoes 24 are carried by brake levers 25, the adjacent ends of which, in the present example, are connected by a link 26 with the short arm of a lever 27, the long arm of which is connected by a rod or wire 28 with a hand lever 29 adapted to engage a rack 30 for holding the lever in given position with the elements 23 released from the brake shoes 24 or locked thereby. The fixed platform section 13 has an opening therein covered by a board 31 hinged as at 32 to be raised for permitting the contents of the automobile truck to be discharged into the pit which extends beneath the lower end of the frame.

The wheels of the automobile and the wagon wheels as well when arriving at the platform 14 run on stringers 33 which are rockable on the shaft 16 so as to drop to a tilted dumping position, and means is provided to sustain the stringers 33 in fixed relation to the platform 14 except when it is desired to dump a wagon. The rear ends of the stringers 33 are adapted to be engaged by the opposite or cranked portions 35 of a transverse latch shaft 34 which is rockable to throw its cranked or latching portions 35 into or out of engagement with the adjacent ends of the stringers, the latter preferably having wear irons 36 to receive the latch parts. The shaft 34 at one end is provided with an operating lever handle 37. To control the movement of the stringers 33 to the dumping position the depending members 38 thereon are provided with curved forward surfaces which are adapted to be engaged by brake shoes 39 on levers 40, the adjacent ends of which are connected by a link 41 common thereto, with the short arm of a lever 42, the long arm of which connects by a wire or rod 43 with an operating hand lever 44 adapted to engage a rack 45 on the stringers 15 of the platform 14 for holding the brake shoes set or released. Thus with the release of the stringers 33 from the latch shaft 34, said stringers may assume an inclined position for dumping a wagon run thereon and the movement to the dumping position can be effectively controlled by the described brake devices.

We provide wheel blocks on the stringers 33 so that the same blocks may engage either wagon wheels or the wheels of the automobile truck for holding the same against rearward movement when being dumped. Said blocks indicated at 48 are of yoke shape and swingably mounted by pivots as at 50 on the reduced rear ends of the stringers 33 so as to swing to a raised position for engaging the vehicle wheels or to a lowered position close to the top surfaces of the stringers 33 to offer no obstruction of the wheels passing over said blocks when thus lowered. Said wheel blocks 48 are controlled by a hand lever 49 which is connected thereto as follows: An arm 51 or a yoke is rigid with each wheel block 48 to swing the same and from said arm a cable 52 is run over pulleys 53, 54 to connect with an operating wire or rod 55 which is connected with the hand lever 49. With the described construction, if a wagon is to be dumped, it is run onto the stringers 33, the wheel blocks are thrown to the raised position by throwing the lever 49 rearwardly, and the latch shaft 34 rocked to release said stringers and permit them to assume under the weight of the load an inclined position as indicated in Fig. 3, the platform 14 remaining in the raised position. In the movement to the inclined position the stringers 33 are controlled by the lever 44 which is initially thrown to a position to cause the shoes 39 to firmly hold against the elements 38 on the stringers. When the wheel blocks 48 have been raised and the latch 34 released, the pressure of the brake shoes 39 is more or less relaxed to permit dumping of the wagon. In dumping grain from the wagon it is dropped through an opening covered by a door 46 hinged as at 47 to the platform 14 to be raised or lowered.

When an automobile truck is to be dumped it also is driven onto the stringers 33 and the blocks 48 are thrown to the raised position by means of the lever 49 as described, the stringers 33 are maintained held by their latch 34 and the lever 19 is thrown rearwardly to so rock the latch shaft 17 as to release the rear end of the platform 14, the brake shoes 24 having been first applied by means of the lever 29, so that the combined dump may assume a tilted position, shown in Fig. 4, the stringers 33 being constrained to remain in the plane of the platform 14. Fig. 4 shows the dump under the control of the brake shoes 24 in moving to the dumping position; the dump may thus assume such a tilt that the rear end of the automobile will project below the fixed flooring of the structure. The provision for applying the controlling means at the front end of the dump gives a maximum clearance at the rear end and permits of the pit being extended beneath the dump structure. The arrangement permits of the end board of the truck or wagon being removed before the dump is tilted and with assurance that the grain will be directed to the pit.

It will be noted that the latch means and the braking or controlling means for the wagon dump as well as the hand levers thereof are mounted upon the automobile dump while the latch means and the controlling means for the automobile dump, the levers therefor as well as the lever and major portion of the controlling means for the wheel blocks 48 are mounted upon the fixed frame structure. The arrangement simplifies the installation and results in a convenient arrangement of the various controlling means and the operative connections with the hand levers are subjected to no undue strains in the operation of either the wagon dump or automobile dump.

We would state in conclusion that while the illustrated example constitutes a practical embodiment of our invention we do not limit ourselves strictly to the mechanical details herein illustrated, since manifestly the same can be considerably varied without departure from the spirit of the invention as defined in the appended claims.

Having thus described our invention we claim:

1. A combined wagon and automobile dump including a fixed frame structure, a platform mounted to tilt for the dumping of an automobile, latch means for said platform to hold it in the raised position, a lever to actuate said means, the latch mechanism being mounted on the fixed structure, manually operable controlling means to govern the dumping movement of the platform, said controlling means being mounted on the fixed structure, a wagon dump mounted to tilt relatively to the platform for dumping a wagon or to tilt with the platform when an automobile is being dumped, latch means to hold the wagon dump rigid with the platform, and controlling means independent of the first controlling means to govern the dumping movement of the wagon dump, the latch means and the controlling means for the wagon dump being mounted on said platform to partake of the movements thereof.

2. A combined wagon and automobile dump including a platform mounted to tilt for the dumping of an automobile, a wagon dump mounted to tilt relatively to the platform for dumping a wagon or to tilt with the platform when an automobile is being dumped, and independent controlling means to govern the dumping movements of the wagon dump and the platform.

3. A combined wagon and automobile dump including a platform mounted to tilt for the dumping of an automobile, a wagon dump mounted to tilt relatively to the platform for dumping a wagon or to tilt with the platform when an automobile is being dumped, and separate controlling means for said wagon dump and for said platform and optionally operable to govern the dumping movements thereof, both of said controlling means being engageable with the platform and dump respectively at the front ends thereof.

4. A combined wagon and automobile dump including a platform mounted to tilt for the dumping of an automobile, a wagon dump mounted to tilt relatively to the platform for dumping a wagon or to tilt with the platform when an automobile is being dumped, and controlling means for said wagon dump and platform to govern the dumping movements thereof, said controlling means being engageable with the platform and dump at the front ends thereof; together with manual operating means for said controlling means, said operating means including hand levers adjacent to the rear end of the dump.

5. A combined wagon and automobile dump including a platform mounted to tilt for dumping an automobile, stringers constituting a wagon dump and mounted to tilt relatively to said platform for the dumping of a wagon or to tilt with the platform in the dumping of an automobile, and wheel blocks mounted on said stringers at the rear end and adapted to engage the rear wheels of either a wagon or an automobile.

6. A combined wagon and automobile dump including a platform mounted to tilt for dumping an automobile, stringers constituting a wagon dump and mounted to tilt relatively to said platform for the dumping of a wagon or to tilt with the platform in the dumping of an automobile, vertically swingable wheel blocks mounted on said stringers near the rear ends thereof, a fixed structure relative to which the platform and stringers may tilt, a manually operable lever on said fixed structure, and connections between said lever and said blocks, said lever being optionally operable to swing the latter to a position for service or to a lowered position.

FRANK J. LEECH.
WILLIAM H. MYERS.